United States Patent [19]

Morris et al.

[11] Patent Number: 5,342,543
[45] Date of Patent: Aug. 30, 1994

[54] NEUTRALIZING ABSORBENT FOR ACIDS AND BASES

[75] Inventors: Clarence H. Morris; James K. Cook, both of Arlington, Tex.

[73] Assignee: Data Medical Associates, Inc., Arlington, Tex.

[21] Appl. No.: 993,915

[22] Filed: Dec. 18, 1992

Related U.S. Application Data

[63] Continuation of Ser. No. 705,765, May 28, 1991, abandoned.

[51] Int. Cl.$^5$ .............................. C09K 3/32; B01J 20/00
[52] U.S. Cl. ..................................... 252/190; 252/193; 252/194; 252/192
[58] Field of Search ........................ 252/190, 193

[56] References Cited

U.S. PATENT DOCUMENTS

| | | | |
|---|---|---|---|
| 4,105,576 | 8/1978 | Seidenberger | 252/190 |
| 4,210,460 | 7/1980 | Seidenberger | 134/7 |
| 4,383,868 | 5/1983 | Braley | 134/7 |
| 4,483,716 | 11/1984 | Heller | 137/7 |
| 4,769,084 | 9/1988 | Gubela | 134/7 |
| 4,840,734 | 6/1989 | Johnson | 210/660 |
| 4,865,761 | 9/1989 | Mandel et al. | 252/190 X |
| 4,913,835 | 4/1990 | Mandel et al. | 252/190 |
| 4,983,389 | 1/1991 | Levy | 424/404 |
| 4,983,390 | 1/1991 | Levy | 424/404 |
| 4,985,061 | 1/1991 | Hughes | 71/68 X |
| 4,985,062 | 1/1991 | Hughes | 71/77 |
| 5,100,932 | 3/1992 | Lockhart et al. | 523/130 |
| 5,126,309 | 6/1992 | Chromecek et al. | 504/402 |
| 5,143,536 | 9/1992 | Runkis | 71/77 |

OTHER PUBLICATIONS

Oops! ™ product flier.
Oops! ™ material safety data sheet.

*Primary Examiner*—Richard D. Lovering
*Assistant Examiner*—Joseph D. Anthony
*Attorney, Agent, or Firm*—Richards, Medlock & Andrews

[57] ABSTRACT

A neutralizing absorbent for acids and bases comprising a superabsorbent powder, a neutralizing chemical, and, optionally, a pH indicator. The absorbent comes in solid form for ease of application. A method for treating acid and base spills is also provided.

12 Claims, 1 Drawing Sheet

NEUTRALIZING ABSORBENT FOR ACIDS AND BASES

This application is a continuation of application Ser. No. 07/705,765, filed May 28, 1991, which is hereby abandoned.

TECHNICAL FIELD OF THE INVENTION

This invention relates to an absorbent for neutralizing acids or bases for disposing of same.

BACKGROUND OF THE INVENTION

Acids and bases, both organic and inorganic, are used routinely in research and clinical laboratories, and in industry. They are most often utilized in liquid form. Regardless of the care taken in handling, accidents resulting in spillage onto the work bench or surrounding environment are not entirely preventable. The caustic nature of many of the acids and bases used renders ordinary clean-up techniques ineffective, if not unsafe. In response, various products and methods have been developed for specifically dealing with chemical spills and, more specifically, spills involving acids and bases. There are limitations attendant to each of the methods and products currently available, however. None provide a method which can be instituted both rapidly and simply, using a product with a wide-spectrum of use for acid and base spills, which comprises a superabsorbent material, capable of localizing the spill during absorption, and a means for neutralizing the offensive chemical.

U.S. Pat. No. 4,840,734, issued to Edward R. Johnson on Jun. 20, 1989, discloses a product and process for absorbing liquid leaks and spills. The patent discloses that the product comprises a closed cell having a cell wall permeable to liquid. Within the cell is an inorganic, inert absorbent. The patent discloses that the absorbent is preferably selected from a number of inert inorganic materials which are capable of absorbing an excessive amount of liquid and that it is desirable to provide an absorbent which will neutralize chemicals which are otherwise reactive. Preferable absorbents listed include clay, vermiculite, perlite, diatomaceous earth, hydrous aluminum silicate, and calcium carbonate. The patent further discloses that, in the case of absorbing acidic spills, the cell wall material should be made of materials such as polyester or cotton terrycloth. Although the patent discloses that a neutralizing chemical may be contained within the interior of the cell wall, the absence of a neutralizing chemical in the cell wall itself presents a hazard to subsequent handlers, as well as upon ultimate disposal. This is particularly true in the instance where caustic acids or bases are absorbed since, with an enclosed cell, the handler's first impulse would be to pick up the cell and thereby come in direct contact with the caustic material. Additionally, the absorbent cell size is predetermined and is not tailored to the needs of a particular incident. Consequently, a cell may be too large or too small for a particular spill. Furthermore, no superabsorbent material is disclosed.

U.S. Pat. No. 4,769,084, issued to Hans-Erich Gubela on Sep. 6, 1988, discloses synthetic chemical absorbents. The invention disclosed is a phenol resin foamed plastic which has been milled into a powder or fine flakes, the grain size of which would preferably be between 0.5 and 2 mm. The patent discloses that, in one embodiment, the resin can be treated with a base or an acid in order to enable neutralization of an acid or base, respectively. The patent discloses that the resin works more by principles of adsorption, instead of absorption, being based upon the depositing of the material to be adsorbed on as many surfaces as possible. Alternate embodiments suggest that the resin be used as packing material. Because the disclosed method of action—adsorption—acts as a function of surface area contact with the spill, this invention appears most suited for the situation in which the adsorbent material could be completely immersed in the liquid to be adsorbed, as opposed to being dispensed on top of liquid which has been spilled. No superabsorbent material is disclosed.

U.S. Pat. No. 4,483,716, issued to Harold L. Heller on Nov. 20, 1984, discloses a poultice method for extracting hazardous spills. The patent discloses that the absorbent material enables the removal of chemicals spilled on porous surfaces. Prior to application to the spill, the components must be blended together to form a slurry or paste. The components include absorbent materials such as clay, silica, or calcium carbonate and a volatile solvent. The patent discloses that the composition may also contain a gelling agent to help maintain the slurry in position after application. As the slurry dries, it wicks the chemical up through the porous surface. Eventually, the slurry dries to a powder. The patent discloses that a detoxifying agent, such as sodium polyethylene glycol, can be incorporated into the composition. The focus of the patent, however, appears to be upon the detoxification of materials such as halogenated organic compounds and not acids or bases, nor is such an application suggested. Furthermore, the solvent requirement appears to limit the scope of use and ease of application since the patent discloses that the solvent must be chosen in accordance with the solubility characteristics of the spilled chemical. Additionally, if a detoxifying agent is employed, the solvent must be selected to be compatible with the detoxifying agent as well. The method of the patent is to be tailored to meet the chemistry requirements of a particular spill, as opposed to providing an absorbent with a wide spectrum of use. No superabsorbent material is disclosed.

U.S. Pat. No. 4,210,460, issued to James W. Seidenberger on Jul. 1, 1980, discloses a spill control composition and the use thereof. This patent is directed specifically to spills of hydrofluoric acid only. The composition comprises an aqueous solution of calcium acetate, powdered magnesia, and a pH indicator. The patent discloses that the calcium acetate solution is applied to the spill first, in a quantity usually at least seven times the estimated volume of the spilled acid. When a white precipitate is formed, the magnesium is brought into solution and then added to the spill composite. A slurry is then formed. The patent discloses that the method of the invention allows for a safe and effective means of cleaning up the hydrofluoric acid without excess evolution of heat and fumes. As such, the method is somewhat complex and time-consuming. No superabsorbent material is disclosed.

None of the art discussed above describes a method, or composition, which is both simple in application yet effective, and which enables clean-ups and disposals which are both quick and safe—i.e., provide a neutralizing agent and a superabsorbent material—for a wide-spectrum of acid and bases. Due to the foregoing, a method and composition which provides all of the aforementioned qualities and limits contact with the potential hazardous materials is urgently needed.

SUMMARY OF THE INVENTION

The present invention enables quick, yet effective, clean-ups of acids and bases. The potential dangers inherent in such clean-up procedures are minimized by the employment of neutralizing agents and a superabsorbent material. Additionally, color indicators can be incorporated which change color at about a neutral pH, thereby providing a visual detection scheme for assessing neutralization. A color change indicates that the spill is safe for subsequent handling. The superabsorbent material forms a gel upon contact with the liquid, thereby preventing contamination of other areas and further preventing handlers from making direct contact during disposal. The likelihood of handling highly acidic or basic solutions is greatly decreased.

In one aspect, the invention comprises a dry absorbent comprising a superabsorbent powder and a neutralizing chemical. In a further aspect, the dry absorbent can contain a color indicator which changes color at about a neutral pH.

In another aspect, the invention comprises a method for treating and cleaning acid and base spills. According to the method of the invention, a dry absorbent comprising a superabsorbent powder, a neutralizing chemical, and, optionally, a color indicator is contacted with the spill. The absorbent is allowed to remain upon the spill for a sufficient time to allow complete neutralization and absorption of the spilled material. After all the material has been absorbed, as indicated by the formation of a gel, and the color indicator has changed, signifying that a neutral pH has been reached, the material can be wiped up and disposed of in a usual safe manner.

In a further aspect, the invention comprises a spill kit for treating and cleaning acid and base spills. The kit comprises a dispenser facilitating even dispersal of an absorbent material contained within. The absorbent material comprises a superabsorbent powder, a neutralizing chemical, and, optionally, a color indicator which changes color at about a neutral pH.

In yet another aspect, the invention comprises a method for safely disposing of caustic liquids which have been used in cleaning laboratory or industrial equipment, or in any other application. The method comprises adding a dry absorbent comprising a superabsorbent material and a neutralizing chemical to the used liquid in an amount sufficient to absorb all the liquid, forming a gel of about neutral pH. The gel can then be disposed of in a usual, safe manner.

DETAILED DESCRIPTION

Figure 1:
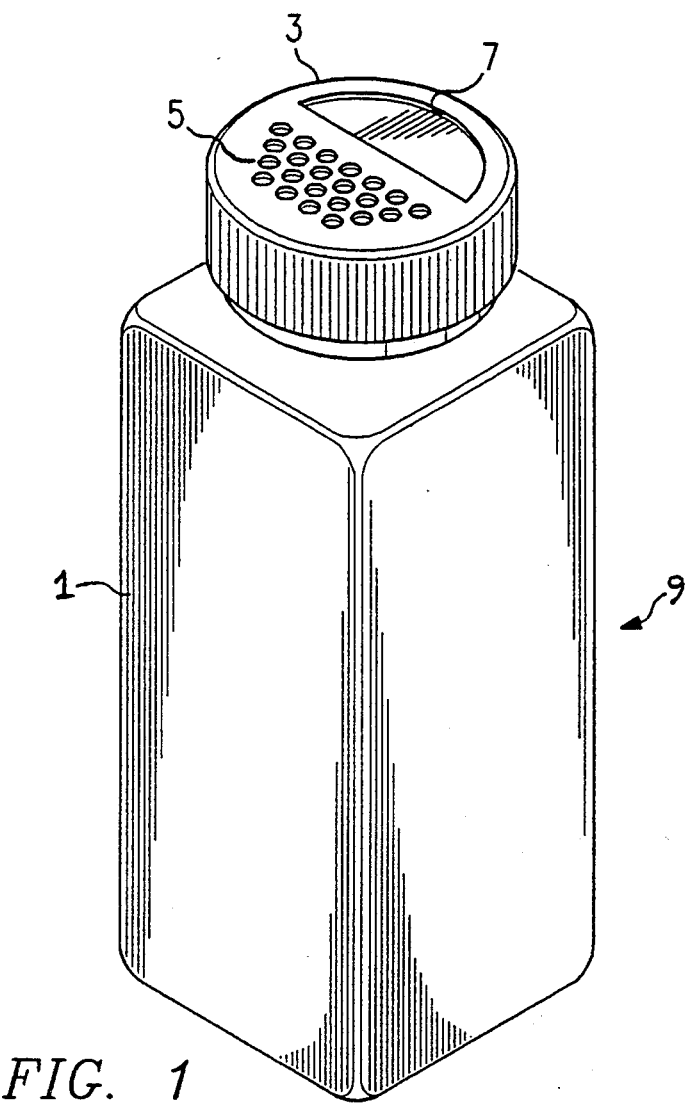
FIG. 1 is a depiction of one of the dispensers contemplated by the invention.
Figure 2:
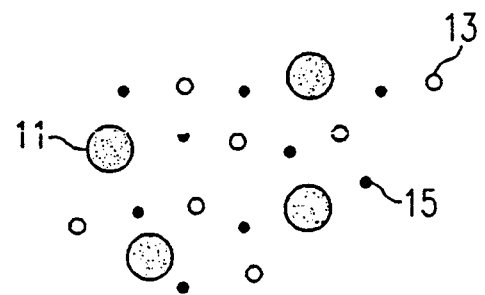
FIG. 2 is a representation of the absorbent material of the invention.

The absorbent of this invention enables quick, effective, and safe clean-ups of acids and bases. As evidenced by the art discussed above, most of the currently available methods of cleaning up acid or base spills are designed to function on a much larger scale, or are rather complex in application. Some of the limitations of the methods and absorbents discussed previously are the requirement for premixing prior to application, the necessity for predetermining the size of the spill accurately enough to prepare sufficient material initially and the absence of a material which can be dispersed evenly and safely to completely contain all areas of the spill after just one application.

When a spill occurs, be it in the laboratory or in the workplace, it is important that the spill be cleaned up as quickly and safely as possible. Safety is not dependent upon complete absorption alone. Since many acids and bases are extremely caustic, it is also important that the material be sufficiently neutralized so that it is no longer caustic. To further insure safety of handlers during clean-up, it is also desirable to have a means for determining when the material has been neutralized. The incorporation of a color indicator which changes color upon reaching a neutral, or near neutral, pH will not only enable the handler to determine when neutralization, or near neutralization, has occurred, but will also enable the handler to determine areas which remain non-neutralized and which may require the addition of more absorbent.

The absorbent of the invention is a dry, powder-like material. This facilitates quick application of the absorbent onto a spill and prevents the potential splattering of material likely to be encountered by the application of a liquid onto a liquid. All that is required is the application of the absorbent onto the area where the spill occurred. No premixing of components or predetermining of amounts necessary is required. The absorbent of the invention employs a superabsorbent material 11 available in powder form and which forms a gel upon contact with aqueous solutions. The superabsorbent material is capable of absorbing many times its weight in liquid volume. The use of a superabsorbent material minimizes storage volume, while increasing the effectiveness of absorption. In one embodiment, the superabsorbent material can comprise a polyacrylate. In a preferred embodiment, the superabsorbent material to be employed is DriMop, available from Multiform Desiccants, Inc. DriMop is capable of absorbing up to 400 times its weight in liquid volume.

The neutralizing chemical 13 is selected in accordance with the material to be neutralized. For example, an absorbent employing a base would be used on spills of acidic substances and, conversely, an absorbent employing an acid would be used upon spills comprising basic substances. A neutralizing chemical is defined as a chemical which can raise the pH of an acidic solution to about 7.0, or lower the pH of a basic solution to about 7.0, thereby permitting safe handling.

The types of spills most commonly encountered in the laboratory or workplace include the following compounds: acetic acid, formic acid, hydroiodic acid, hydrobromic acid, hydrochloric acid, nitric acid, perchloric acid, phosphoric acid, sulfuric acid, benzoic acid solutions, ammonium hydroxide, ethylenediamine, hydrazine, pyridine, potassium hydroxide solution, sodium hydroxide solutions, and triethanolamine. The treatment of these spills, as well as others, is within the scope of this invention. The compounds listed above comprise both weak and strong, organic and inorganic acids and bases.

In order to be most effective, the invention encompasses at least two separate classes of absorbents—one for acids and one for bases. Consequently, the neutralizing chemical in the absorbent for acidic substances can comprise, without limitation, one of the following: sodium bicarbonate, sodium carbonate, and calcium carbonate, or combinations thereof. The absorbent for basic substances can comprise, without limitation, boric acid, benzoic acid, citric acid or combinations thereof.

Optionally, the absorbent of the invention can further comprise a color indicator for confirming that the absorbed material has reached neutral or near neutral pH. The color indicator 15 can be a dye such as, without limitation, bromocresol green, bromocresol purple, bromothymol blue, cresol red, methyl red, or any other material which changes color when the pH of the surrounding environment shifts from acidic to basic or, conversely, basic to acidic. Color indicators which change color in a narrow range at about a neutral pH are preferred. Neutral pH is defined as a pH of about 7.0. However, even absent a color indicator, the pH of the material being absorbed can be verified with commercially available pH indicator tape prior to disposal.

In one embodiment, the superabsorbent material, the neutralizing chemical, and the color indicator are all present in the absorbent as individual components, thoroughly mixed to uniform consistency and dispersion with the absorbent, and in proportions effective for thoroughly neutralizing and absorbing the spilled material. In an alternate embodiment, the absorbent of the invention comprises the superabsorbent material and neutralizing chemical at concentrations of five percent and ninety-five percent by weight, respectively.

The methods of the invention employ the absorbent material described above. A ready-to-use material in powder form eliminates any pre-mixing steps and enables rapid dispersal of the absorbent onto the spill. In one embodiment, the absorbent may be applied from a dispenser (see FIG. 1) having two alternative openings in the top—one to enable the sprinkling of the absorbent material onto the area of the spill 5 and another to enable rapid pouring of the material onto larger spills 7 or, alternatively, into containers of caustic waste solutions. The absorbent material can also be supplied in large canisters with scoops for applying the absorbent material to areas of much larger spills. A shaker-type dispenser can be stored easily and in a manner allowing easy access. Upon the occurrence of spillage, the appropriate absorbent material is selected for application in accordance with the spill. After the absorbent has been liberally applied to the spill, sufficient time is allotted for the liquid to be thoroughly neutralized and absorbed. During absorption of the liquid, the acid or base is simultaneously being neutralized to a level that is not caustic. If a color indicator is incorporated, neutralization will be evidenced by a strong color change. For example, if bromocresol green is employed, and the spill involves an acidic substance, a blue color is observed as the spill is neutralized. Alternatively, if bromocresol purpose is employed, a purple color is observed. The color change is strong and occurs as the spill is being neutralized and absorbed.

After a gel has formed and, optionally, an observable color change indicating neutralization has occurred, the subsequent clean-up requires simply scooping up the gel for disposal as refuse and wiping the surface free of any residual material. The gel formation contains the potentially hazardous spill within a localized area, thereby preventing further contamination of other areas.

The spill kit of the invention comprises a dispenser 9 and the absorbent of the invention as described above. In one embodiment, the dispenser 9 can be similar to that depicted in FIG. 1. The dispenser 9 consists of an outer casing 1. The casing can be formed from cardboard, aluminum, tin, glass, plastic, or any other suitable material for storing the neutralizing chemicals of the invention. The dispenser 9 can further comprise a lid 3 having various openings allowing the absorbent material inside to be sprinkled onto the spill or, alternatively, poured on the spill. The lid 3 can be can be selected to be of the same material as the casing, or may consist of another material. In an alternative embodiment, the lid can consist of a plastic-type material and have lipped edges allowing for removal of the lid for refilling and subsequent resealing. In a further embodiment, the container can have a twist-top mechanism for alternately exposing and closing holes in the top, or can have a resealable spout for pouring. In yet another embodiment, the spill kit can comprise a multiplicity of single application packets.

The absorbent of the invention can also be used to safely dispose of waste material consisting of acid or base solutions which have been used in industrial or laboratory cleaning solutions. For example, solutions of diluted sulfuric acid are often employed for soaking tissue culture pipets prior to cleaning. The absorbent of the invention can be added directly to the used waste solution of diluted sulfuric acid, in an amount sufficient to absorb all the liquid and simultaneously neutralize the caustic nature of the material. Since the absorbent of the invention employs superabsorbent material, very small amounts of the neutralizing absorbent of the invention are necessary to absorb large volumes. In this manner, direct handling of the caustic material is avoided and disposal no longer consists of pouring the used material down the drain, risking injury to both persons and property. A gel is formed upon complete absorption. Since a neutralizing chemical is employed, the gel formed will be at about a neutral pH, and can be disposed of in any usual safe manner. If the absorbent contains a neutralization indicator, a strong color change will confirm that neutralization has occurred.

The above description is intended to be illustrative of the invention, and is not intended to limit the invention in any manner. As is readily apparent to those skilled in the art, other materials may be substituted for those disclosed and still be within the scope and spirit of the invention.

We claim:

1. A homogeneous dry powdered absorbent composition suitable for absorbing and neutralizing acids which are in liquid form, comprising:
   a) a sufficient amount of a superabsorbent powder to provide said absorbent composition with a total liquid absorption capacity of about 20 times the total dry weight of said absorbent composition and which forms a gel upon contact with a liquid; and
   b) a dry powdered neutralizing chemical for neutralizing said acids such that the absorbent composition forms a gel of about neutral pH upon contact with said acids.

2. The absorbent of claim 1 wherein the superabsorbent powder comprises a polyacrylate.

3. The absorbent of claim 1 wherein the neutralizing chemical is selected from the group consisting of sodium bicarbonate, sodium carbonate, calcium carbonate and combinations thereof.

4. The absorbent of claim 1, further comprising a neutralization indicator which changes color at about a neutral pH.

5. The absorbent of claim 4 wherein the neutralization indicator is a dye.

6. The absorbent of claim 4 wherein the neutralization indicator is selected from the group consisting of bromocresol green, bromocresol purple, bromothymol blue, cresol red and methyl red.

7. A homogeneous dry powdered absorbent composition suitable for absorbing and neutralizing bases which are in liquid form, comprising:
  a) a sufficient amount of a superabsorbent powder to provide said absorbent composition with a total liquid absorption capacity of about 20 times the total dry weight of said absorbent composition and which forms a gel upon contact with a liquid; and
  b) a dry powdered neutralizing chemical for neutralizing said bases such that the absorbent composition forms a gel of about neutral pH upon contact with said bases.

8. The absorbent of claim 7 wherein the superabsorbent powder comprises a polyacrylate.

9. The absorbent of claim 7 wherein the neutralizing chemical is selected from the group consisting of boric acid, benzoic acid, citric acid and combinations thereof.

10. The absorbent of claim 7, further comprising a neutralization indicator which changes color at about a neutral pH.

11. The absorbent of claim 10 wherein the neutralization indicator is a dye.

12. The absorbent of claim 10 wherein the neutralization indicator is selected from the group consisting of bromocresol green, bromocresol purple, bromothymol blue, cresol red and methyl red.

* * * * *